Sept. 22, 1970   M. W. KELLINGTON   3,529,852

TRACTOR HITCH

Filed Nov. 21, 1968

Inventor
MAURICE WILLIAM KELLINGTON

By *Michael S. Striker*
Attorney

United States Patent Office 3,529,852
Patented Sept. 22, 1970

3,529,852
TRACTOR HITCH
Maurice W. Kellington, Gainsborough, England, assignor to Marshall Sons & Company Limited, Gainsborough, England, a British company
Filed Nov. 21, 1968, Ser. No. 777,741
Claims priority, application Great Britain, Dec. 1, 1967, 54,713/67
Int. Cl. B62d 53/00
U.S. Cl. 280—461                                11 Claims

ABSTRACT OF THE DISCLOSURE

In a tractor hitch of the kind comprising two lower laterally spaced tension links connected to the tractor and a third upper compression link which is also connected to the tractor and is disposed substantially centrally relative to the lower links, all three links being pivotable relative to the tractor in substantially vertical planes, the three links are pivotally connected to a sub-frame and the sub-frame is pivotally connected to the tractor for swinging movement in a substantially horizontal plane. Power-operated means may be provided for adjusting the height of the rear ends of at least one of the lower links.

---

This invention relates to a three-point linkage type of hitch for mounting an implement on a tractor so as to be partially or wholly carried by the tractor, said hitch being of the kind comprising two lower laterally spaced tension links connected to the tractor and a third upper compression link which is also connected to the tractor and is disposed substantially centrally relative to the lower links, all three links being pivotable relative to the tractor in substantially vertical planes. Usually in such hitches the two lower tension links are connected to the power lift system of the tractor for the purpose of raising and lowering these two links.

Conventional hitches of the kind referred to have their three links pivotally connected at one end to the tractor, with the three points of connection forming an equilateral triangle disposed in a substantially vertical plane lying transversely of the tractor. Such hitches are widely used on agricultural tractors, and many implements are available for complete or partial mounting by means of such hitches on two- or four-wheel drive tractors and on track-laying tractors.

The advantages of completely or partially mounted implements (hereinafter referred to simply as "mounted implements") are numerous and considerable. As compared with wholly trailed implements, i.e. implements which are wholly supported on the ground by their own ground-engaging wheels or skids, they are cheaper and require less maintenance. Because they can be lifted clear of the ground by the power lift system of the tractor on which they are mounted, they are more maneuverable and quicker turns can be achieved at headlands. Again, only comparatively narrow headlands are required for turning a tractor with a mounted implement as compared with that required for turning a tractor with a wholly trailed implement.

However, a considerable disadvantage of a mounted implement carried on a tractor by the conventional three-point linkage type of hitch, particularly when such implement is a plough, is that because of the arrangement of the hitch symmetrically with respect to the longitudinal axis of the tractor, the latter has of necessity to move over the ground with at least one driving wheel or one track running in a furrow formed in the ground which has already been ploughed.

In the first place this has the very undesirable effect of compacting the soil in the furrow in which the driving wheel or wheels or track is running. Again, the size of wheel that will fit into a normal ploughed furrow is limited to approximately 11 inches (28 cms.) in width unless the furrow is of increased width which, in practice, is generally unacceptable to the majority of users. The tyre of the, or each, wheel running in a furrow suffers undue wear by contact of the side walls of the tyre with the wall of the furrow. Finally, since a tractor with its wheel or wheels on one side running in a furrow is inclined to the horizontal, it is unavoidable that the wheel or wheels in the furrow each carry more of the weight of the tractor than the equivalent wheel or wheels on the other side of the tractor running on the unploughed land. This means that wheel spin of the driven wheel or wheels running on the unploughed land is likely to occur, unless the tractor is provided at extra expense with means for preventing such wheel spin.

In the case of a track-laying tractor, it is desirable that it should always run completely on unploughed land, firstly to avoid excessive wear and tear on the tracks and their mountings resulting from running in furrows, and secondly because the track plate width is limited to approximately 11 inches (28 cms.) unless furrows of greater width are ploughed, which as mentioned above is generally unacceptable.

It is known to overcome the above-mentioned disadvantages by operating the tractor with all its ground-engaging wheels or tracks running on unploughed land, and offsetting the plough relative to the tractor so as to engage the soil at one side of the tractor beyond the extent of the wheels or tracks thereof. With an offset plough mounted on a conventional three-point linkage type of hitch, the required line of draft on the plough is offset from the longitudinal axes of the tractor and the lingage, resulting in unequal distribution of loads in the two lower links of the hitch. A turning moment is therefore applied to the tractor causing it to tend to turn towards the more heavily loaded side. This lateral unbalance of the tractor causes the driver constantly to make steering corrections with resultant wear on the tyres or tracks and the steering gear.

An object of the present invention is to provide a hitch of the kind referred to which overcomes the disadvantages outlined above.

According to the invention a hitch of the kind referred to is characteirsed in that the three links are pivotally connected to a sub-frame and the sub-frame is pivotally connected to the tractor for swinging movement in a substantially horizontal plane.

Preferably, the three links are directly pivoted to the sub-frame.

By arranging for the pivotal connection of the sub-frame to the tractor to lie on or closely adjacent to the centre of pull of the tractor, the turning moment referred to previously, which arises when an offset implement is used, is almost if not completely eliminated. By taking the pull from the centre of pull of the tractor, the lower links of the hitch swing laterally into a position of equilibrium and steering of the tractor is only required to negotiate obstacles and for normal turning purposes.

In order to take up the load imposed on the sub-frame by the upper compression link of the hitch, the sub-frame may be arranged to bear against a suitable frame member of the tractor. For example, a roller may be mounted on the sub-frame for rotation about a vertical axis, and this roller may be arranged to bear against a suitably curved support member mounted on the tractor frame. In order to restrain the sub-frame in the vertical direction, a member of the sub-frame may be guided in its swinging movement between substantially horizontally disposed upper and lower guide plates.

On a conventional three-point linkage hitch the two lower links are connected to the power lift system of the tractor via telescopic elements, the lengths of which can be adjusted either in increments by inserting a pin or pins through holes in the inner and outer members of the telescopic elements or b yp roviding a screw-threaded connection between the inner and outer members of the telescopic elements. This adjustment facility is necessary to enable the ends of the lower links which are attached to the implement to be postioned at different levels in relation to each other, whereby a lateral tilt may be imparted to the implement.

A disadvantage of the type of telescopic element described above is that it is frequently inconvenient to operate, particularly when accessibility is restricted by other equipment mounted on, or forming a part of, the tractor, and also the effort required to adjust the telescopic element, particularly the effort required to shorten a screw-threaded telescopic element, when subject to considerable tension load with the implement in the ground, is very considerable.

According to a further feature of this invention, the new hitch proposed above has at least one of its lower links connected to the power lift system of the tractor via a member whose length can be varied by the supply of a pressurised fluid medium to, and/or the withdrawal of pressurised fluid medium from, the member. Preferably, said member is in the form of a single- or double-acting hydraulic piston and cylinder assembly.

Preferably, both of the lower links of the hitch are connected to the power lift system of the tractor via such pressure fluid operated members, and each member is connected to a source of pressurised fluid via a directional control valve. Operation of one or both these differential control valves, either manually or by suitable electrical means, controls the flow of pressurised fluid to and from one or both of the members so as to cause a shortening or lengthening of one member or any desired change in length of both members, resulting in rapid adjustment of the lateral inclination and/or level of the implement mounted on the hitch. For use with implements which are equipped with ground-engaging wheels, provision may be made for unlocking said pressure fluid operated member or members, so that the implement is free to run on its wheels and oscillate laterally with respect to the tractor.

The third link of the hitch may also comprise a member whose length can be varied by the supply of pressurised medium to, and/or the withdrawal of pressurised fluid from, the member. Here again, said member preferably is in the form of a single- or double-acting hydraulic piston and cylinder assembly.

The invention will now be described in greater detail, by way of example, with reference to the accompanying drawing, in which FIG. 1 is a partly sectioned, schematic side elevation of a hitch in accordance with the invention.

Figure 1:
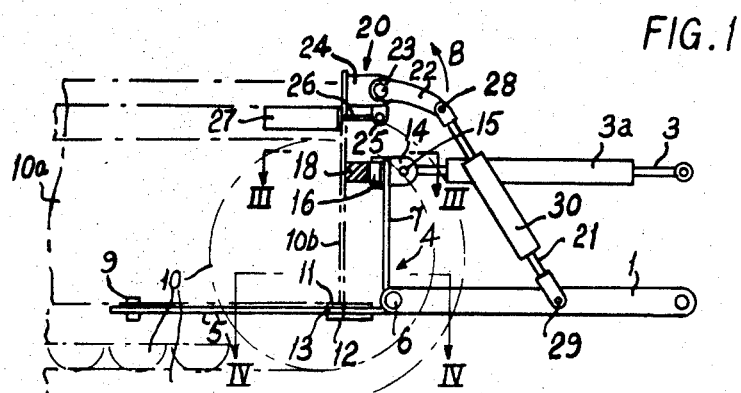

The hitch shown in the drawing comprises two lower laterally spaced tension links 1, 2 and an upper compression link 3, all three links having their forward ends directly pivotally connected to a sub-frame generally designated by the reference numeral 4. The link 3 comprises a telescopic element 3a by means of which its length may be adjusted. Preferably, this telescopic element is in the form of a double-acting hydraulic piston and cylinder assembly.

Figure 2:
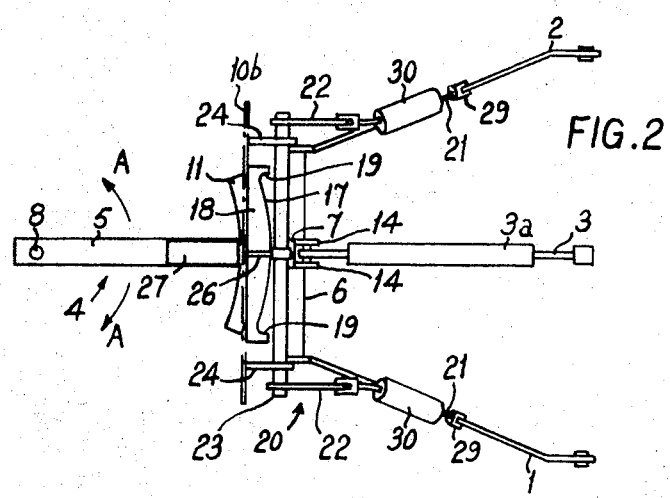
FIG. 2 is a plan of the hitch shown in FIG. 1.
Figure 3:
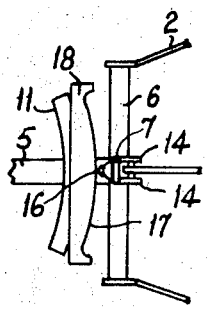
FIGS. 3 and 4 are sectional plans of parts of the hitch of FIGS. 1 and 2, taken on the lines III—III and IV—IV, respectively, of FIG. 1.
Figure 4:
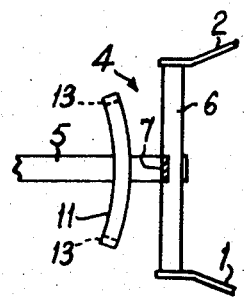

The sub-frame 4 comprises a horizontally disposed draw bar 5, a horizontally disposed transverse member 6 rigidly secured midway between its ends to the rear end of the draw bar 5, and a vertical strut 7 secured at its lower end to the rear end of the draw bar 5. At its forward end, the draw bar 5 is provided with a hole 8 by means of which the draw bar is pivotally mounted on a substantially vertical pivot 9 mounted on a part 10a (shown in chain lines in FIG. 1 only) of the frame of a crawler tractor. Part of the track gear of this tractor is indicated by the chain line 10 in FIG. 1 only. Near its rear end, the draw bar 5 is received between upper and lower curved guide plates 11 and 12 secured to a plate 10b (shown in chain lines in FIGS. 1 and 2 only) forming part of the tractor frame. Swinging movement of the draw bar about the pivot 9 in the directions of the arrows A is limited by stops 13 at the ends of the guide plates 11, 12, these stops also serving as distance pieces between the guide plates.

At its upper end, the strut 7 is provided with two laterally spaced lugs 14 which support a universal pivot connection 15 for the forward end of the upper link 3. Adjacent to its upper end, the strut 7 supports a cylindrical roller 16 for rotation about a substantially vertical axis. The peripheral surface of the roller 16 bears against the convexly curved surface 17 of a support member 18 which is firmly secured to the plate 10b of the tractor frame. The centre of curvature of the surface 17 coincides with the axis of the pivot 9, so that the roller 16 remains in contact wth the surface 17 as the sub-frame 4 swings about the pivot 9. The support member 18 comprises laterally spaced stops 19 which also serve to limit the swinging movement of the sub-frame 4 by limiting movement of the roller 16 along the surface 17.

The forward ends of the lower links 1, 2 are pivotally mounted on the transverse member 6, one at each end thereof. The lower links 1, 2 are connected to the tractor power lift system, which is generally designated by the reference numeral 20, by telescopic elements 21.

The power lift system 20 comprises a pair of laterally spaced arms 22 rigidly secured to a horizontally disposed transverse shaft 23 which is rotatably mounted in bearings 24 secured to the tractor frame. A lever 25 projecting from the shaft 23 intermediate its ends is pivotally connected to the rear end of the piston rod 26 of a single-acting hydraulic piston and cylinder assembly 27 mounted on the plate 10b of the tractor frame. By supplying pressurised fluid to the piston and cylinder assembly 27 the two arms 22 are caused to pivot simultaneously in the direction indicated by the arrow B. If fluid is allowed to exhaust from the piston and cylinder assembly 27, the arms 22 pivot in the opposite direction under the influence of the weight of the lower links 1, 2.

The rear ends of the arms 22 are connected to the upper ends of the telescopic elements 21 by universal connections 28. The lower ends of the telescopic elements 21 are pivotally connected at 29 to the lower links 1, 2. Each of the telescopic elements 21 preferably comprises a double-acting hydraulic piston and cylinder assembly 30.

From the above description it will be appreciated that the two lower links 1, 2 and the upper link 3 can swing with the sub-frame 4 about the pivot 9 between the limits imposed by the stops 13 and 19, so that when the hitch is employed to operate an offset mounted implement the lower links can swing laterally to a position of equilibrium. Relative movement between the swingable links 1, 2 and the arms 22 is accommodated by the universal connections 28. During operation of the implement, the thrust exerted on the upper link 3 by the implement is transferred to the tactor frame via the roller 16 and the support member 18.

Any desired adjustment of the transverse inclination and/or level of the implement mounted on the hitch can be achieved by appropriate lengthening or shortening of one or more of the telescopic elements 3a, 21.

Suitable control levers (not shown) would be provided in the cab of the tractor to enable the driver to control the telescopic elements 3a and 21 when these are in the form of hydraulic piston and cylinder assemblies.

Whilst the hitch according to the invention has been shown in the drawing as mounted on a crawler tractor, it will be appreciated that the hitch is also intended to be used with wheeled tractors.

What is claimed is:

1. A tractor hitch of the kind comprising two lower laterally spaced tension links connected to the tractor and a third upper compression link which is also connected to the tractor and is disposed substantially centrally relative to the lower links, all three links being pivotable relative to the tractor in substantially vertical planes, characterised in that the three links are pivotally connected to a sub-frame and the sub-frame is pivotally connected to the tractor for swinging movement in a substantially horizontal plane.

2. A tractor hitch of the kind comprising two lower laterally spaced tension links connected to the tractor and a third compression link which is also connected to the tractor and is disposed substantially centrally relative to the lower links, all three links being pivotable relative to the tractor in substantially vertical planes and the two lower tension links being connected to the power lift system of the tractor for the purpose of raising and lowering these two links, characterised in that the three links are pivotally connected to a sub-frame and the sub-frame is pivotally connected to the tractor for swinging movement in a substantially horizontal plane.

3. A tractor hitch as claimed in claim 1, comprising power-operated means for adjusting the height of the rear ends of at least one of the lower links.

4. A tractor hitch as claimed in claim 3, in which at least one of said lower links is connected to the power lift system of the tractor via a member whose length can be varied by the supply of a pressurised fluid medium to, and/or the withdrawal of pressurised fluid medium from, the member.

5. A tractor hitch as claimed in claim 4, in which said member is a single- or double-acting hydraulic piston and cylinder assembly.

6. A tractor hitch as claimed in claim 1, in which the three links are directly pivoted to the sub-frame.

7. A tractor hitch as claimed in claim 1, in which the sub-frame is arranged to bear against a frame member of the tractor.

8. A tractor hitch as claimed in claim 7, comprising a roller mounted on the sub-frame for rotation about a vertical axis, which roller is arranged to bear against a curved support member mounted on the tractor frame.

9. A tractor hitch as claimed in claim 1, in which the sub-frame is guided in its swinging movement between substantially horizontally disposed upper and lower guide plates.

10. A tractor hitch as claimed in claim 1, in which the third link comprises a member whose length can be varied by the supply of a pressurised medium to, and/or the withdrawal of pressurised fluid from, the member.

11. A tractor hitch as claimed in claim 10, in which said member is a single- or double-acting hydraulic piston and cylinder assembly.

References Cited

UNITED STATES PATENTS

| | | | |
|---|---|---|---|
| 2,698,564 | 1/1955 | Sawyer | 280—456 X |
| 3,031,208 | 4/1962 | Abbott | 280—467 X |
| 3,421,779 | 1/1969 | Shelby | 280—479 |
| 3,432,184 | 3/1969 | Tweedy | 280—479 |
| 3,462,172 | 8/1969 | Thor | 280—479 |

LEO FRIAGLIA, Primary Examiner

U.S. Cl. X.R.

280—479, 468; 172—447